E. C. BACON.
SWINGING FAUCET CONNECTION.
APPLICATION FILED JULY 7, 1915.
1,175,918.
Patented Mar. 21, 1916.
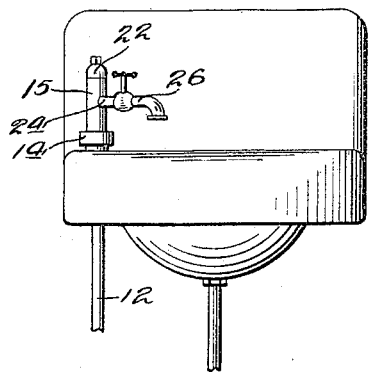
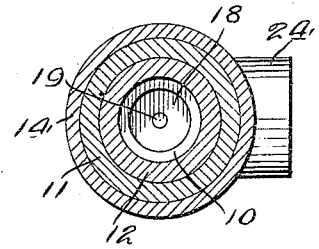
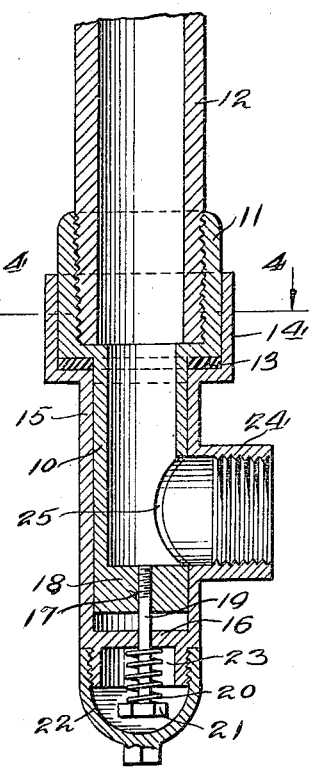
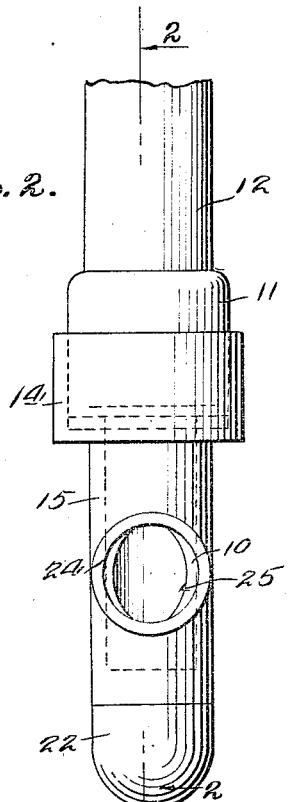
Witnesses
Edw. S. Hall.
Ross J. Woodward.
Inventor
Eugene C. Bacon.
By Richard B. Owen.
Attorney

UNITED STATES PATENT OFFICE.

EUGENE C. BACON, OF MEDINA, NEW YORK.

SWINGING-FAUCET CONNECTION.

1,175,918.

Specification of Letters Patent. Patented Mar. 21, 1916.

Application filed July 7, 1915. Serial No. 38,563.

*To all whom it may concern:*

Be it known that I, EUGENE C. BACON, a citizen of the United States, residing at Medina, in the county of Orleans and State of New York, have invented certain new and useful Improvements in Swinging-Faucet Connections, of which the following is a specification.

This invention relates to a device for connecting a faucet with a water supply pipe and the principal object of the invention is to so construct the connection as to permit the faucet to be swung to one side so that it will be out of the way. It very often happens that when washing dishes in a sink, glasses will strike against the faucet and become broken and it is to prevent this that the swinging connection has been provided.

Another object of the invention is to so construct the connection that water can only pass into the spigot when the spigot is over the sink thus preventing danger of the water leaking from the spigot onto the floor.

Another object of the invention is to so construct the connection as to form a tight joint between the inner and outer sleeves thus preventing the joint itself from leaking.

This invention is illustrated in the accompanying drawings, wherein:—

Figure 1 is a view showing the attachment as applied to a basin, Fig. 2 is a view in elevation showing the attachment as it would appear when applied to the supply pipe of a sink, Fig. 3 is a section taken along the line 2—2 of Fig. 2, Fig. 4 is a section taken along the line 4—4 of Fig. 3.

From a comparison of Fig. 1 with Figs. 2 and 3 it will be readily seen that this device may be used in either an upwardly extending or a downwardly extending position, the device being so constructed that a tight joint will be formed irrespective of its position. The inner sleeve 10 is provided with an internally threaded collar or union 11 by means of which the inner sleeve may be connected with the water supply pipe 12. This collar 11 forms an abutment shoulder for the washer or other packing 13 positioned between the collar 11 and the collar 14 of the outer sleeve 15. This outer sleeve 15 is rotatably mounted upon the inner sleeve 10 and is provided at its lower end with a head 16 having an unthreaded opening formed therein and positioned in alinement with a threaded opening 17 formed in the thickened head 18 of the inner sleeve 10. A securing bolt 19 which also forms a pivot pin for the outer sleeve passes through the opening of head 16 and is screwed into the threaded opening 17 of head 18 thereby connecting the outer sleeve with the inner sleeve. In order to hold the outer sleeve in tight engagement with the packing, washer or gasket 13 there is provided a spring 20 which is positioned about the outer end portion of bolt 19 between the head 16 and the head 21 of the bolt. A cap 22 is screwed upon the threaded end 23 of the outer sleeve so that in case any water passed in through the opening of head 16 it would not leak onto the floor. This outer sleeve is provided with an internally threaded extension or arm 24 which registers with an outlet opening 25 in the inner sleeve when the spigot 26 is over the sink or basin as shown in Fig. 1. Therefore this connection is provided with a valve structure which prevents water from passing into the spigot while the spigot is turned away from the sink.

When this device is in use the collar 11 of the inner sleeve will be screwed onto the water supply pipe of the basin or sink and the spigot will be screwed into the outlet arm 24. The water supply can then be turned on and when the spigot is in the position shown in Figs. 1, 2 and 3 water will pass through the outlet arm into the spigot. After the basin or sink has been filled as far as desired the spigot can be swung to one side thus moving the spigot from over the basin and sink and at the same time closing the outlet opening 25 and preventing any water passing into the spigot from the supply pipe. It is obvious that this connection could be used for other purposes such for instance as for connecting a spigot with a supply pipe terminating in a wall pocket thus permitting the spigot to be swung outwardly for connecting the garden hose. In that case the arm 24 will register with the opening 25 when the spigot was swung outwardly and would close the opening 25 when the spigot was swung inwardly.

It should be noted that while this device is simple in construction it is very effective in operation and will not readily get out of order or need repair, the only part which may need renewal being the gasket or washer 13.

What is claimed is:—

A connection of the character described comprising an inner sleeve open at one end and closed at the other and provided with an outlet opening in one side, an outer sleeve rotatably mounted upon said inner sleeve and provided with an outlet neck for registering with the outlet opening of said inner sleeve, the outer sleeve having one end closed and provided with an opening formed in alinement with an opening in the closed end of the inner sleeve, a securing bolt passed through the alined openings in the closed ends of said sleeves, and having a head positioned in spaced relation to the closed end of said outer sleeve, a spring positioned between the closed end of said outer sleeve and the head of said securing bolt, to yieldably hold said outer sleeve against longitudinal movement upon said inner sleeve, a collar carried by said outer sleeve around said securing bolt, a cap carried by said collar to inclose said securing bolt, and a packing for said outer sleeve, said springs causing said packing to be compressed to form a tight joint.

In testimony whereof I affix my signature in presence of two witnesses.

EUGENE C. BACON.

Witnesses:
WARD D. HOLLENBECK,
WILLIAM J. SANTOM.

Copies of this patent may be obtained for five cents each, by addressing the "Commissioner of Patents, Washington, D. C."